(12) United States Patent
Kirillin et al.

(10) Patent No.: US 8,799,165 B2
(45) Date of Patent: Aug. 5, 2014

(54) ELECTRONIC SIGNATURE SECURITY ALGORITHMS

(75) Inventors: Viacheslav Kirillin, Sankt-Petersburg (RU); Sergey Zemlyanskiy, Sankt-Petersburg (RU)

(73) Assignee: Rawllin International Inc., Tortola (VG)

(*) Notice: Subject to any disclaimer, the term of this patent is extended or adjusted under 35 U.S.C. 154(b) by 135 days.

(21) Appl. No.: 13/348,191

(22) Filed: Jan. 11, 2012

(65) Prior Publication Data

US 2013/0179350 A1    Jul. 11, 2013

(51) Int. Cl.
*G06Q 40/00* (2012.01)
*G06Q 20/32* (2012.01)

(52) U.S. Cl.
CPC ................... *G06Q 20/3221* (2013.01)
USPC .......................................................... 705/50

(58) Field of Classification Search
USPC .......................................................... 705/44
See application file for complete search history.

(56) References Cited

U.S. PATENT DOCUMENTS

| | | | |
|---|---|---|---|
| 6,732,270 B1 | 5/2004 | Patzer et al. | |
| 7,249,377 B1 | 7/2007 | Lita et al. | |
| 7,894,812 B1 | 2/2011 | Durig et al. | |
| 8,326,759 B2* | 12/2012 | Hammad | 705/44 |
| 2003/0131115 A1* | 7/2003 | Mi et al. | 709/229 |
| 2006/0206709 A1* | 9/2006 | Labrou et al. | 713/167 |
| 2007/0174630 A1* | 7/2007 | Shannon et al. | 713/183 |
| 2009/0187980 A1* | 7/2009 | Tung | 726/6 |
| 2009/0287921 A1* | 11/2009 | Zhu et al. | 713/155 |
| 2009/0313165 A1* | 12/2009 | Walter | 705/41 |
| 2010/0199089 A1* | 8/2010 | Vysogorets et al. | 713/168 |
| 2010/0274692 A1* | 10/2010 | Hammad | 705/30 |
| 2011/0119155 A1* | 5/2011 | Hammad et al. | 705/26.41 |
| 2011/0197266 A1* | 8/2011 | Chu et al. | 726/5 |
| 2012/0047070 A1* | 2/2012 | Pharris | 705/43 |

FOREIGN PATENT DOCUMENTS

| | | |
|---|---|---|
| CN | 101119471 A | 2/2008 |
| EP | 2093927 A1 | 8/2009 |
| WO | 95/16947 A1 | 6/1995 |
| WO | 2005/083928 A1 | 9/2005 |
| WO | 2009/115528 A1 | 9/2009 |

OTHER PUBLICATIONS

International Search Report dated Jun. 20, 2013 for PCT Application PCT/RU 2012/001061, 6 pages.

* cited by examiner

*Primary Examiner* — Calvin L Hewitt, II
*Assistant Examiner* — Nancy Loan Le
(74) *Attorney, Agent, or Firm* — Amin, Turocy & Watson, LLP

(57) ABSTRACT

Technologies are generally described for security algorithm methods in authorizing and linking devices associated with a customer. A first device can be linked to a customer account. Additional devices can be linked to the customer account. Those devices can be authenticated to perform banking operations using dual factor authentication wherein a customer's login information is a first factor and the customer using a previously authenticated device is a second factor. By using additional methods of authentication, transactions can be done more reliably and securely.

18 Claims, 10 Drawing Sheets

ELECTRONIC SIGNATURE SECURITY ALGORITHMS

TECHNICAL FIELD

This application relates to banking, and more particularly to security algorithms associated with authorizing devices, activating devices, and performing bank operations using dual factor authenticated device authorization.

BACKGROUND

Consumer and business demand for online services has greatly increased in recent years. This is also true in the banking industry where customers expect access to their accounts to both gather information and to perform banking operations. As the desire for online service has grown, so too has the number of internet connected devices. For example, some customers may have a computer at their place of occupation, a computer in a home office, a smart phone capable of connecting to the internet, a tablet computer, etc. Customer expectations are that they be able to access their accounts on any of the myriad of devices they may use to connect to internet services.

With customer expectations demanding multiple device connectivity, detecting fraudulent access to a customer's accounts becomes more complex. Creating an online hub for customers to access their accounts necessarily involves creating a public portal capable of granting a plurality of customers' access to their accounts. This public portal is also capable of being accessed by those without accounts such as those seeking to fraudulently access a customer's account. One way of preventing such fraudulent access is through restricting account access to authenticated devices. For example, access through internet devices can be restricted to allow only those devices a customer registers as belonging to the customer to have access. However, protocols must be established to prevent improper registration of devices to meet the ongoing need for security algorithms associated with the registration of devices to prevent fraud.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Methods disclosed herein relate to registering a device. One method calls for receiving a phone number from a bank client. The phone number can be confirmed as a registered phone number of the customer. It can be verified whether the account contains no linked devices. A first one time password and a second one time password can be generated. The first one time password can be sent to the phone number. The second one time password can be sent to the bank client. The second one time password and a submitted password can be received from the bank client. Both the second one time password and submitted password can be verified.

In another implementation, a client device associated with a customer can contain a display component that can display a user request wherein the display component further receives login information and a banking request from a user based on the user request. A user authentication can authenticate the user based upon sending the login information to a bank server using a communications network. A security component can store in protected memory a security key associated with the client device wherein the security component is can generate an encrypted banking request based on the security key and the banking request. A bank operation component can send the encrypted banking request to the bank server using the communications network.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
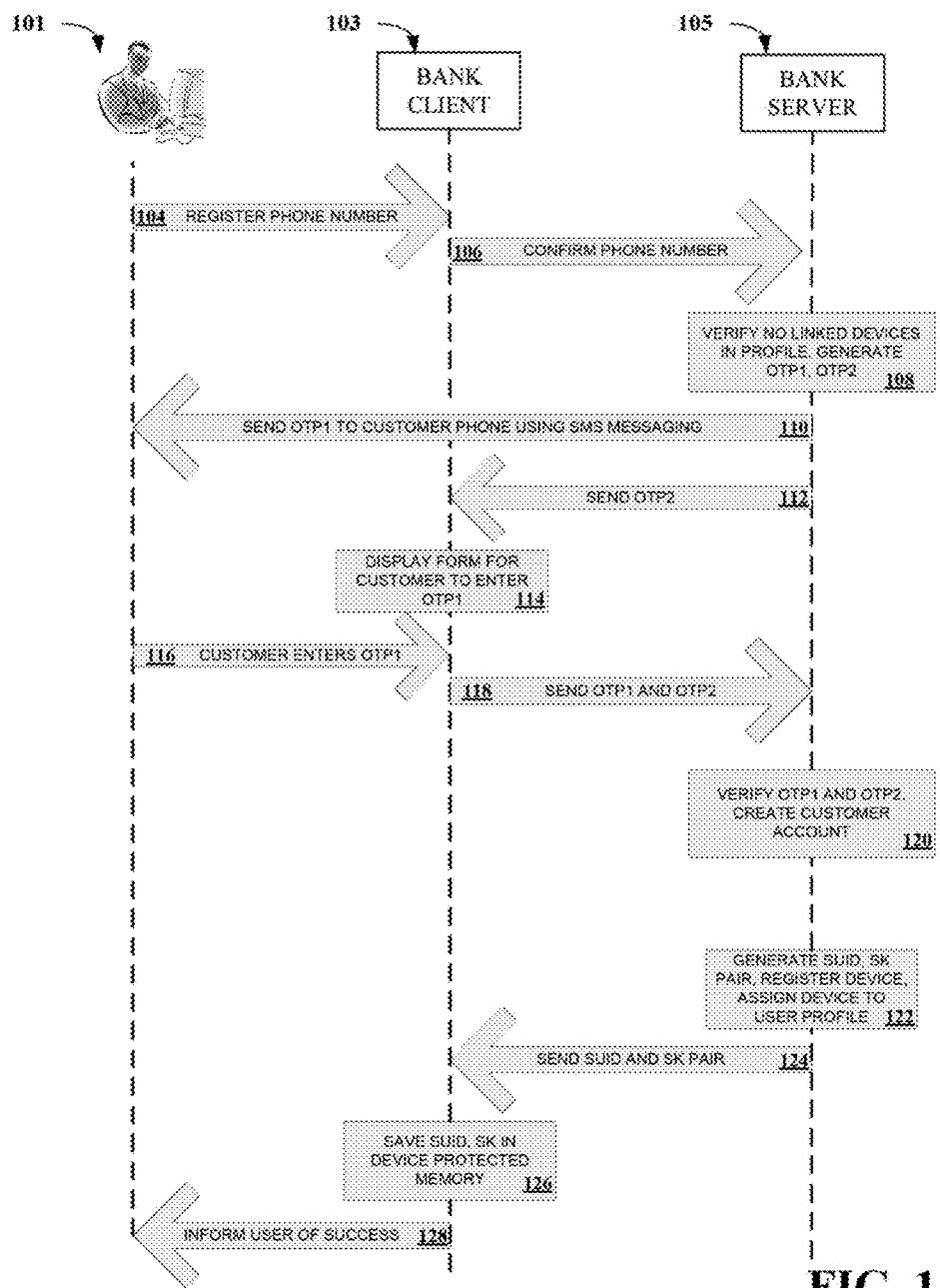
FIG. 1 illustrates an example flow diagram method for device authentication.
Figure 2:
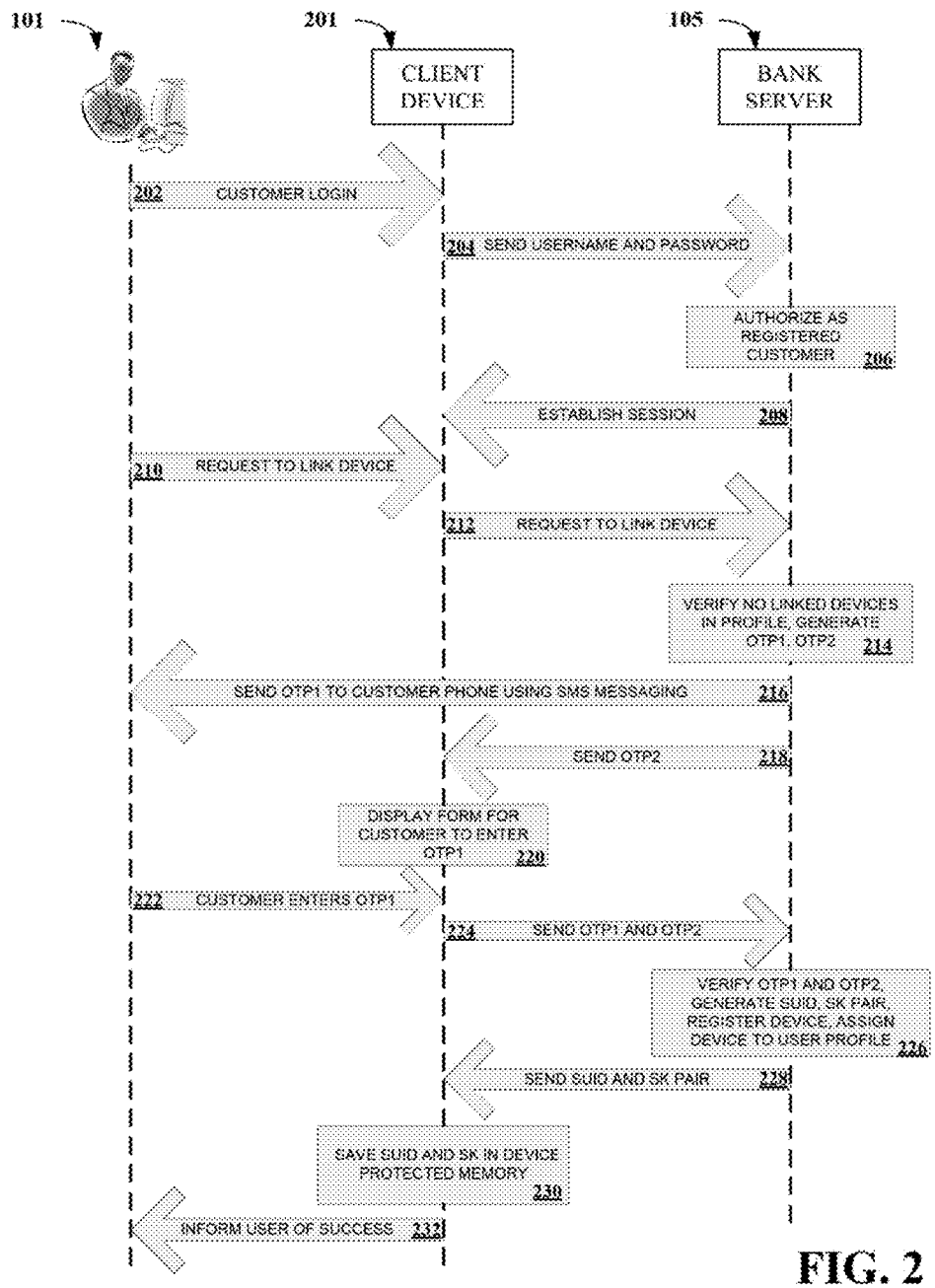
FIG. 2 illustrates an example flow diagram method for device registration.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the various embodiments.

An algorithm of hash code generation can be used to generate a HASH, such as using the MD5 or SHA0-1 algorithms. Thus, a client device and a bank server can both calculate HASH independently of each other. Similarly, symmetric-key algorithms ("SYMM") can be used where the encryption key is related to the decryption key. It can be appreciated that key generation can be uniform or adaptive in various implementations in the subject disclosure.

The architecture disclosure herein can be based on a multi-factor authentication process for banking operations. Operations can be performed over hyper text transfer protocol secure ("HTTPS") which provides server authentication and data confidentiality between a client and a server. In the first factor, customers can be authenticated using a unique username and password. The authenticated customer can access personal data but cannot conduct banking operations.

In one implementation, banking operations can be carried out only with authenticated devices. Both a subscriber id ("SUID") and secret key ("SK") can be used to authenticate a customer device used by an individual customer. A customer can have a list of devices denoted by SUID that have been granted access by the bank to perform banking transaction. Individual banking transactions can be encrypted with a symmetric key that is unique for each transaction. The key for encoding can be calculated based on the SK and a random number ("RND") generated by a bank server. Thus, a customer must be use dual factor authentication using both a unique username and password as a first factor, and an authenticated device as a second factor.

In one implementation, one time passwords can be generated and used to authenticate users and devices in accordance with various implementations in the subject disclosure. For example, a random string of letters and numbers can be generated by a password component. The password component can be adjusted by an administrator the like to adjust the types of characters used or length of a generated password. The password component can reside on a bank server and also generate RND upon request.

FIGS. 1-6 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Turning now to FIG. 1, there is illustrated an example flow diagram method for customer registration using a device. At 104, a customer 101 can register their phone number using bank client 103. At 106, bank client 103 can then confirm with bank server 105 whether the phone number submitted by customer 101 is associated with the customer's accounts. Upon confirmation, at 108, bank server 105 can verify that there are no linked devices associated with the customer's account(s) and generate a first one time password ("OTP") and a second OTP to facilitate registration of the device.

At 110, bank server 105 can send the first OTP via SMS message to the phone number registered at 104 and confirmed at 106. At 112, bank server 105 can send the second OTP to bank client 103. At 114, a form can be displayed on bank client 103 for customer 101 to enter the first OTP. At 116, customer 101 can enter the first OTP. It can be appreciated that customer 101 is instructed to enter the first OTP; however, has the option on the form to enter any combination of letters, numbers or symbols.

At 118, the password submitted by the customer at 116 and the second one time password sent to bank client 103 at 112 can be sent to bank server 105. At 120, the submitted password can be verified as to whether it matches the first OTP. The second OTP submitted at 118 can be verified to match the second OTP sent at 112. A customer account can be created.

At 122, a SUID and SK pair can be generated. A device can be assigned to the customer profile based on the SUID and SK Pair. At 124, the SUID and SK Pair can be sent to bank client 103. At 126, the SUID and SK can saved in device protected memory of the bank client 103. At 128, the customer or user is informed of the success or failure of the device registration process Turning now to FIG. 2, there is illustrated an example flow diagram method for device registration. At 202, customer 101 can login to their account using client device 201. Client device 201 can be a computer, a smart phone, a tablet or an e-reader. Login information can include a user name, password, security phrase, security question, etc. At 204, client device 201 can send to bank server 105 the username, password, or other security information to bank server 105 for authorization. At 206, bank server 105 can authorize customer 101 as a registered customer based on the information sent at 204. At 208, a session can be established between client device 201 and bank server 105 using a RND.

At 210, customer 101 can request through client device 201 to link a device to their customer account. At 212, client device 201 can request that bank server 105 link the device to the customer account as requested by customer 101 at 210. At 214, bank server 105 can verify that no linked devices exist within the customer profile and generate a first OTP ("OTP1") and a second OTP ("OTP2"). At 216, bank server 105 can send OTP1 to a phone linked to customer 101 through SMS messaging. At 218, bank server 105 can send OTP2 to client device 201. At 220, client device 201 can display to customer 101 a form for customer to enter OTP1. At 222, customer can enter OTP1 into the form displayed at 220. At 224, client device 201 can send OTP1 and OTP2 to Bank server 105. At 226, bank server 105 can verify OTP1 and OTP2. Based on the verification, bank server 105 can generate a SUID and SK pair, register the device with the SUID and SK, and assign the device to the customer profile.

At 228, bank server 105 can send the SUID and SK pair to client device 201. At 230, client device 201 can save the SUID and SK in device protected memory. At 232, the user can be informed of success or failure of the linking of the device.

Figure 3:
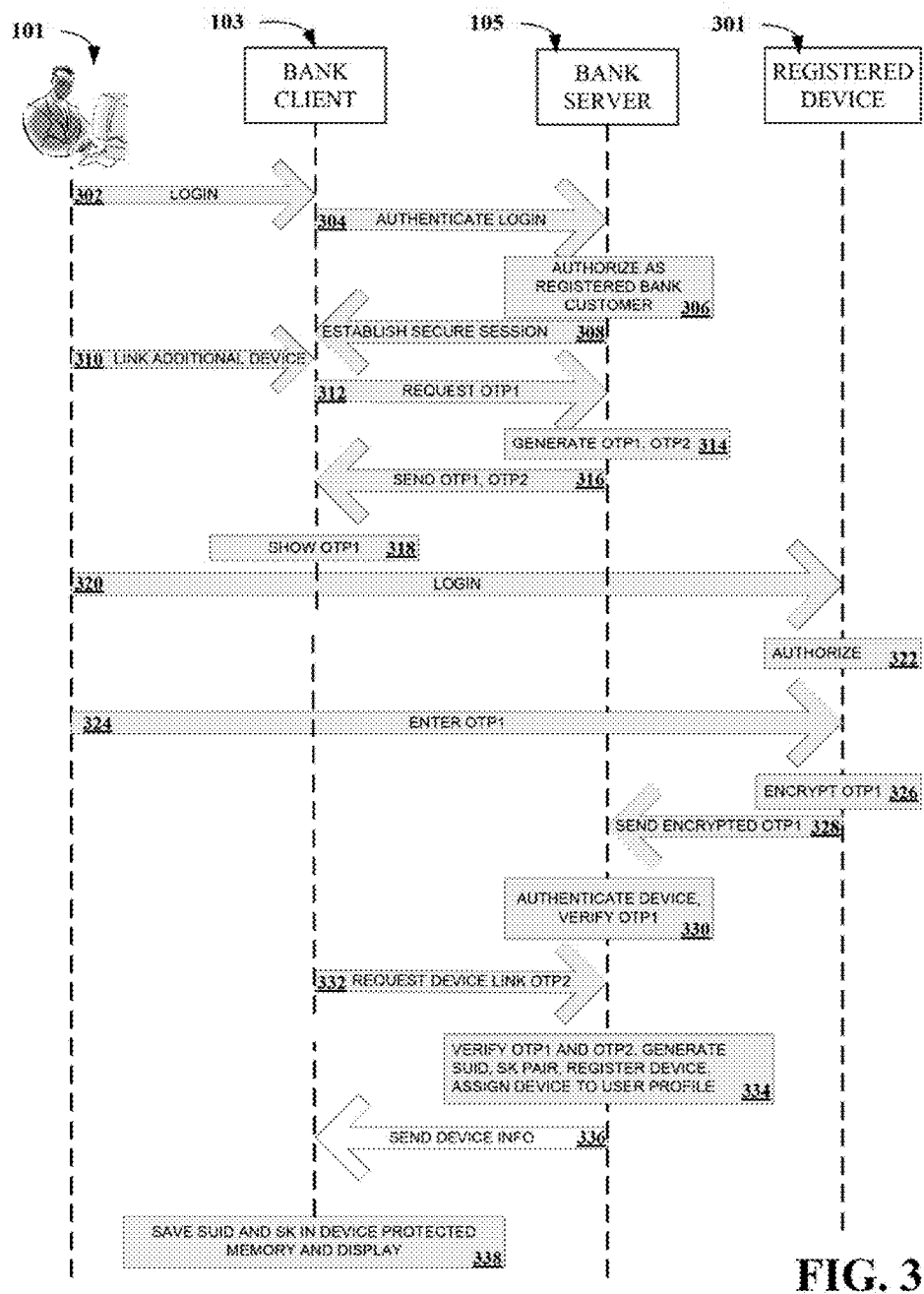
FIG. 3 illustrates an example flow diagram method for customer linking of an additional device.

Turning now to FIG. 3, there is illustrated an example flow diagram method for customer linking of an additional device. At 302, customer 101 can submit login information to bank client 103. Login information can include a username, password, phone number, security phrase, security question, etc. At 304, bank client 103 send to bank server 105 the submitted login information for authentication. At 306, bank server 105 can authorize customer 101 as a registered bank customer. At 308, a secure session can be established using a RND between bank client 103 and bank server 105.

At 310, customer can request the linking of an additional device with bank client 103. At 312, bank client 103 can send a request to bank server 105 for a first one time password ("OTP1"). At 314, bank server 105 can generate OTP1 and a second one time password ("OTP2"). At 316, bank server 105 can send OTP1 and OTP2 to bank client 103 wherein the bank client can display OTP1 to customer 101 at step 318. At 320, customer 101 can login using registered device 301. At 322, bank can authorize customer 101 as a registered customer. At 324, customer 101 can submit OTP1 using registered device 301.

At 326, registered device 301 can encrypt OTP1. Encryption can involve generating a hash code using at least one of MD5 or SHA-1 ("HASH"), generating a symmetric key ("SYMM"), and encrypting OTP1 using the SYMM. At 328, registered device 301 can send the SUID of registered device 301, the HASH, and the encrypted OTP1 to bank server 105.

At 330, bank server 105 can decrypt OTP1, authenticate registered device 301, verify OTP1. At 332, bank client 103 can request bank server 105 link the additional device while also including OTP1 and OTP2 with the request. This can be a looping request that waits for a reply. In one implementation, the request can timeout after a certain period of time. At 334, bank server 105 can verify OTP1 and OTP2, generate a SUID and SK pair, register the additional device, and assign the addition device to the customer profile.

At 336, bank server 105 can send the SUID and the SK pair to bank client 103. At 338, bank client 103 can save the SUID and SK in device protected memory. The success or failure of linking additional device can also be displayed to customer 101.

Figure 4:
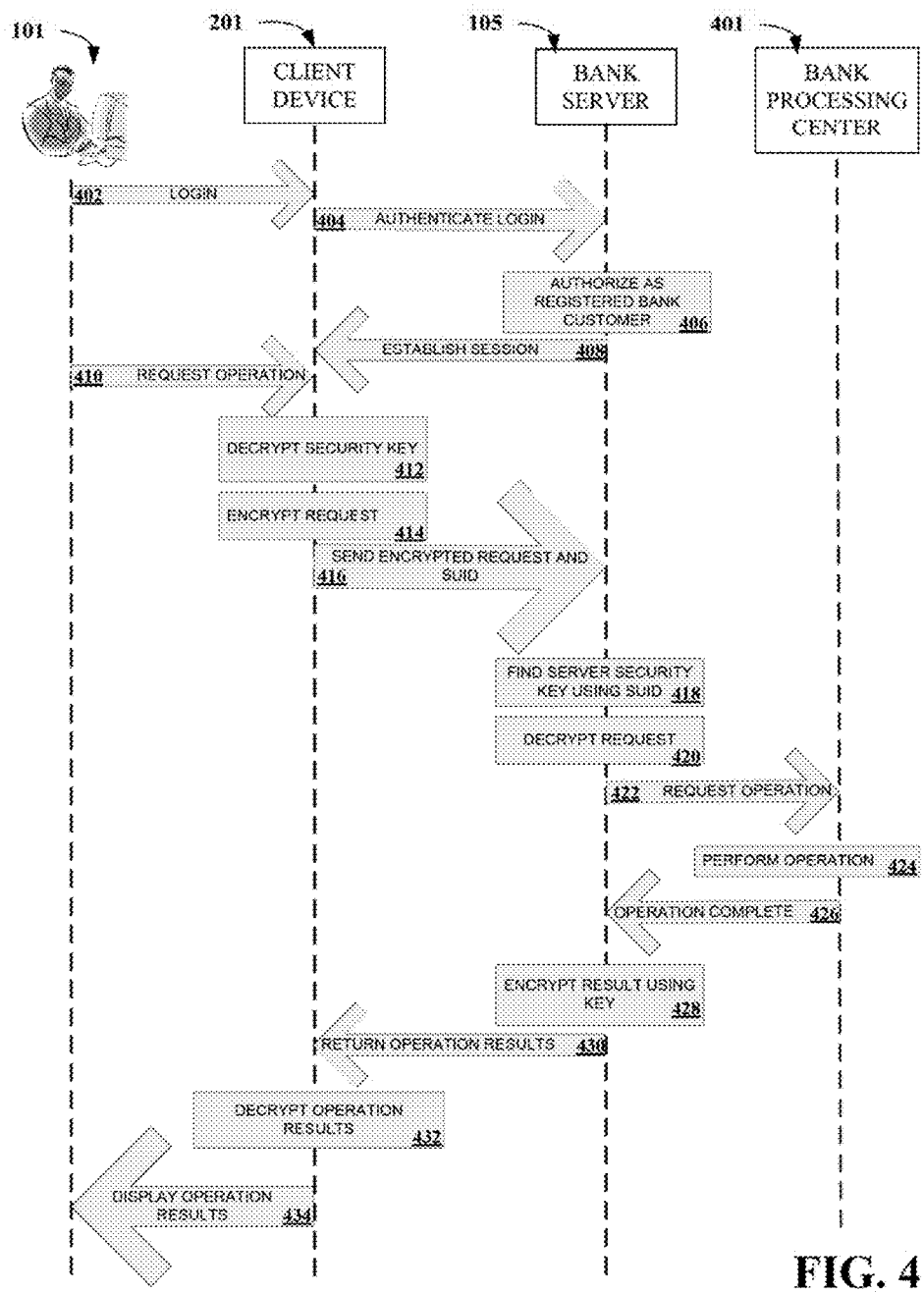
FIG. 4 illustrates an example flow diagram method for dual factor authenticated device transactions.

Turning now to FIG. 4, there is illustrated an example flow diagram method for dual factor authenticated device transactions. At 402, customer 101 can submit login information to client device 201. Login information can include a username, password, phone number, security phrase, security question, etc. At 404, client device 201 can send to bank server 105 the submitted login information for authentication, using, for example, HTTPS. At 406, bank server 105 can authorize customer 101 as a registered bank customer. At 408, a secure session can be established using a RND between client device 201 and bank server 105.

At 410, customer 101 can make a request to client device 201 to perform a bank operation. A bank operation can include at least one of a withdrawal, a deposit, a funds transfer, a bill payment, an account closing request, an account opening request, or a change to a customer profile associated with the customer. At 412, client device 201 can decrypt SK by using the device id. In addition, client device 201 can also calculate HASH and SYMM. At 414, client device 201 can encrypt the operation requested by client 101 at 410 using SYMM. At 416, the encrypted request along with calculated HASH, SYMM, and SUID are sent to bank server 105. At 418, bank server 105 can determine the SK using the SUID of client device 201. It can further calculate HASH and SYMM based off the SK. At 420 bank server 105 can compare the HASH and SYMM bank server 105 generated at 418 to HASH and SYMM sent by client device 201 at 416. Using the comparison, bank server 105 can verify whether the HASH is valid, whether the device is blocked, and whether the device is linked to customer 101. Bank server 105 can then decrypt the bank request using SYMM.

At 422, bank server 105 can request performance of the bank operation by bank processing center 401. It can be appreciated that bank processing center can reside on bank server 105 or alternatively be located in a disparate location. At 424 bank processing center can perform the bank operation. At 426, bank server can 105 receive bank operation result from bank processing center 401. The bank operation result can include an indication of success or failure, a return of information, or an explanation of performance.

At 428, the bank operation result can be encrypted using SYMM. Additionally, a new RND can be generated for device authentication. At 430, the encrypted bank operation result can be returned to client device 201. The generated RND at 428 can be used in sending the encrypted bank operation result. At 432, client device 201 can decrypt the bank operation result. At 434, the bank operation result can be displayed to customer 101 on client device 201.

Figure 5:
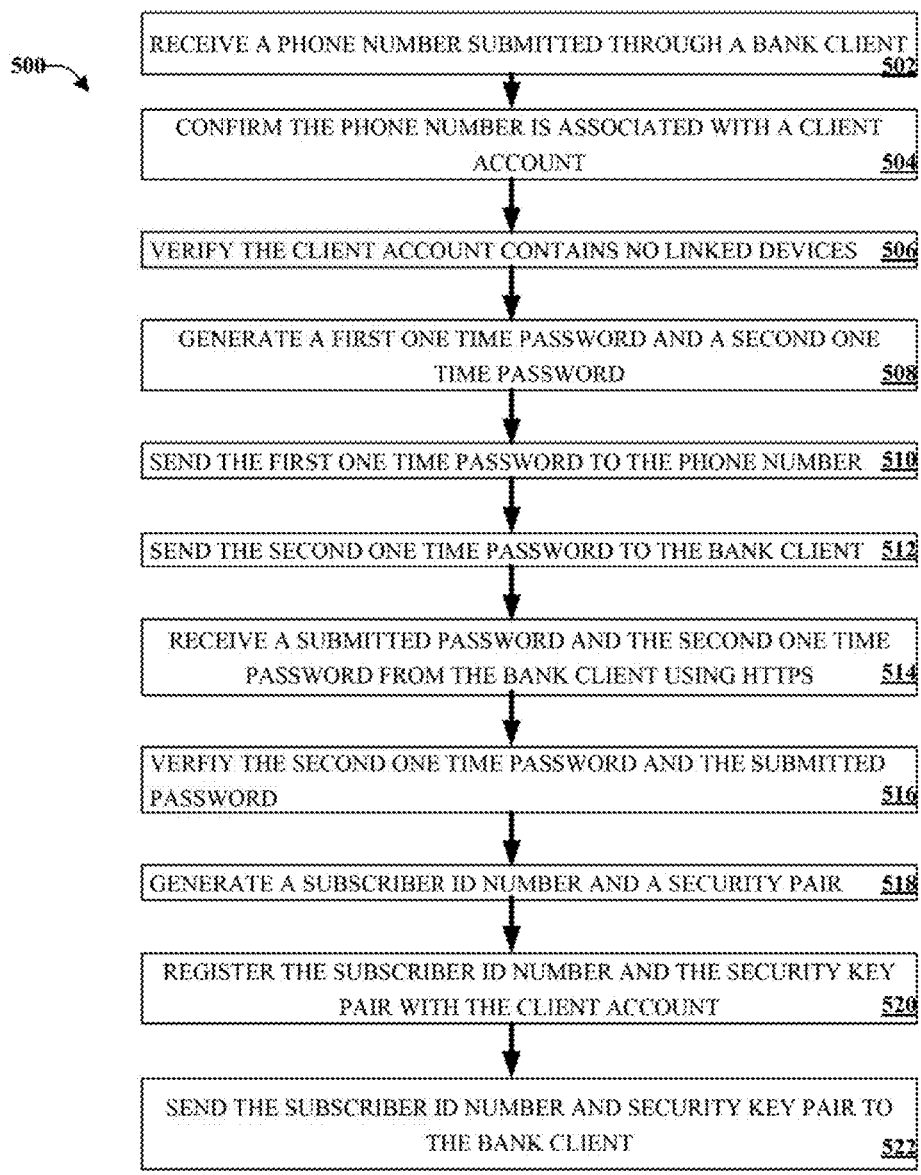
FIG. 5 illustrates an example flow diagram method for a device authentication.

Turning now to FIG. 5, there is illustrated an example flow diagram method 500 for a device authentication. At 502, a phone number can be received (e.g., by a communications component) that was submitted through a bank client. At 504, the phone number can be confirmed (e.g., by an authentication component) that it is associated with a client account. At 506, it can be verified (e.g., by an authentication component) that the client account contains no linked devices At 508, a first one time password and a second one time password can be generated (e.g., by a password component). At 510, the first one time password can be sent (e.g., by a communications component) to the phone number. For example, the password could be sent via SMS text message. At 512, the second one time password can be sent to the bank client. At 514, the submitted password and the second one time password can be received (e.g., by a communications component) from the bank client using HTTPS.

At 516, the second one time password and the submitted password can be verified (e.g., by an authentication component). For example, the second one time password should match the second one time password sent at 512. The submitted password should match the first one time password sent to the phone number at 510.

At 520, a subscriber identification number and a security key pair can be generated (e.g., by a security component). At 522, the subscriber identification number can be associated (e.g., by a security component) with the client account. At 524, the subscriber identification number and the security key pair can be sent (e.g., by a communications component) to the bank client where it can be stored (e.g., by a security component) in device protected memory. In addition, the customer can be notified of the device registration.

Figure 6:
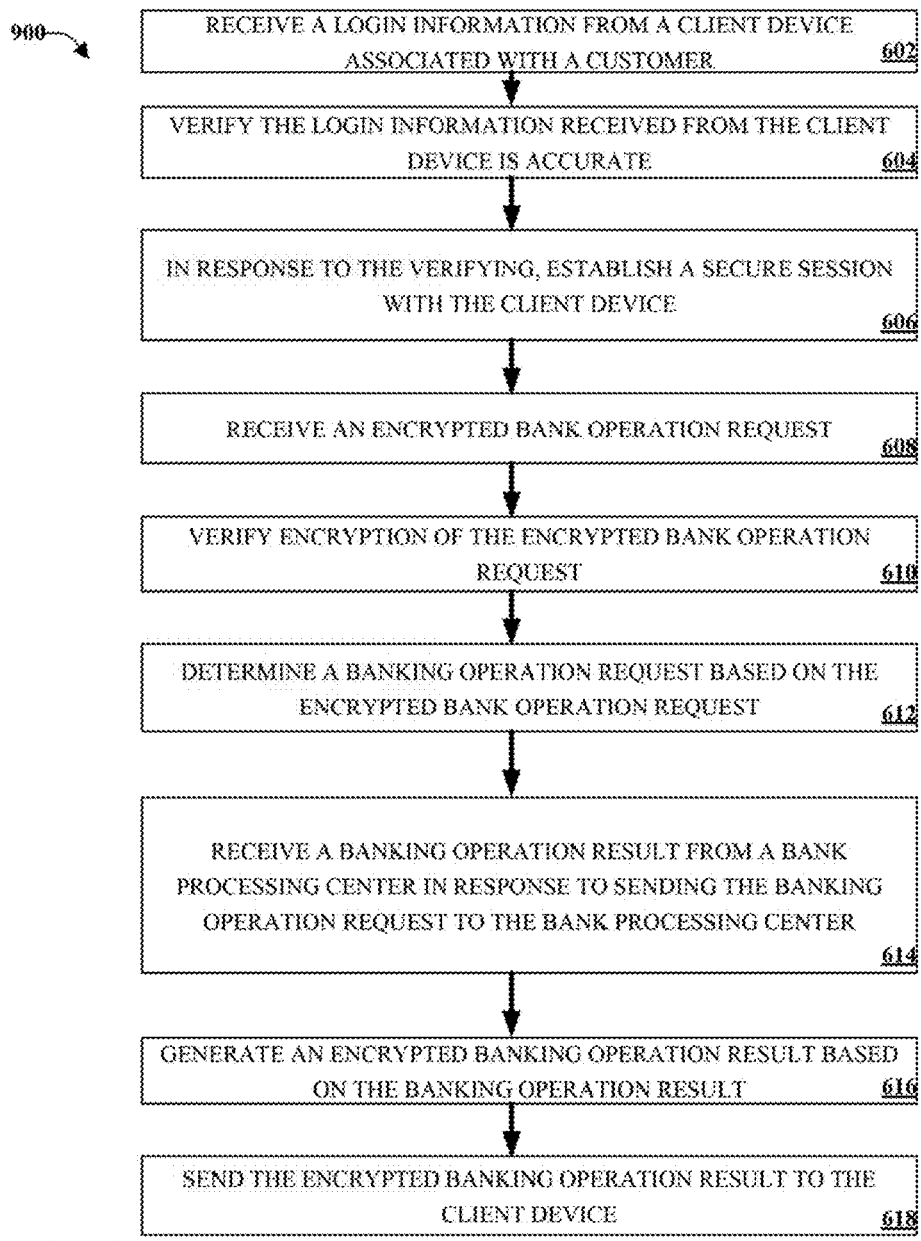
FIG. 6 illustrates an example flow diagram method for a dual factor authentication transaction.

Turning now to FIG. 6, there is illustrated an example flow diagram method for a dual factor authentication transaction.

At 602, login information can be received (e.g., by a communications component) from a client device associated with a customer. At 604, the login information received from the client device can be verified (e.g., by an authentication component) for accuracy. For example, a data store containing customer logins information can be used in conjunction with verifying the submitted login information for accuracy. At 606, in response to the verifying at 604, a secure session can be established (e.g., by a communications component) with the client device.

At 608, an encrypted bank operation request can be received (e.g., by a communications component). At 610, the encryption associated with the encrypted bank operation request can be verified for accuracy (e.g., by an authentication component). For example, SYMM, HASH or other methods of verification can be used. At 612, a banking operation request can be determined (e.g., by a decryption component) based on the encrypted bank operation request. For example, the encrypted bank operation request can be decrypted using the encryption method verified at 610.

At 614, a banking operation result can be received (e.g., by a communications component) from a bank processing center in response to sending the banking operation request to the bank processing center. It can be appreciated that the bank processing center can located behind a firewall or other security means in order to prevent unauthorized transactions from occurring. Security protocols can be used to facilitate the bank processing center acknowledging the request sent at 614 to be a legitimate request. At 616, an encrypted banking operation result can be generated (e.g., by an encryption component) based on the banking operation result. At 618, the encrypted banking operation result can be sent (e.g., by a communications component) to the client device for, for example, decryption and display.

Figure 7:
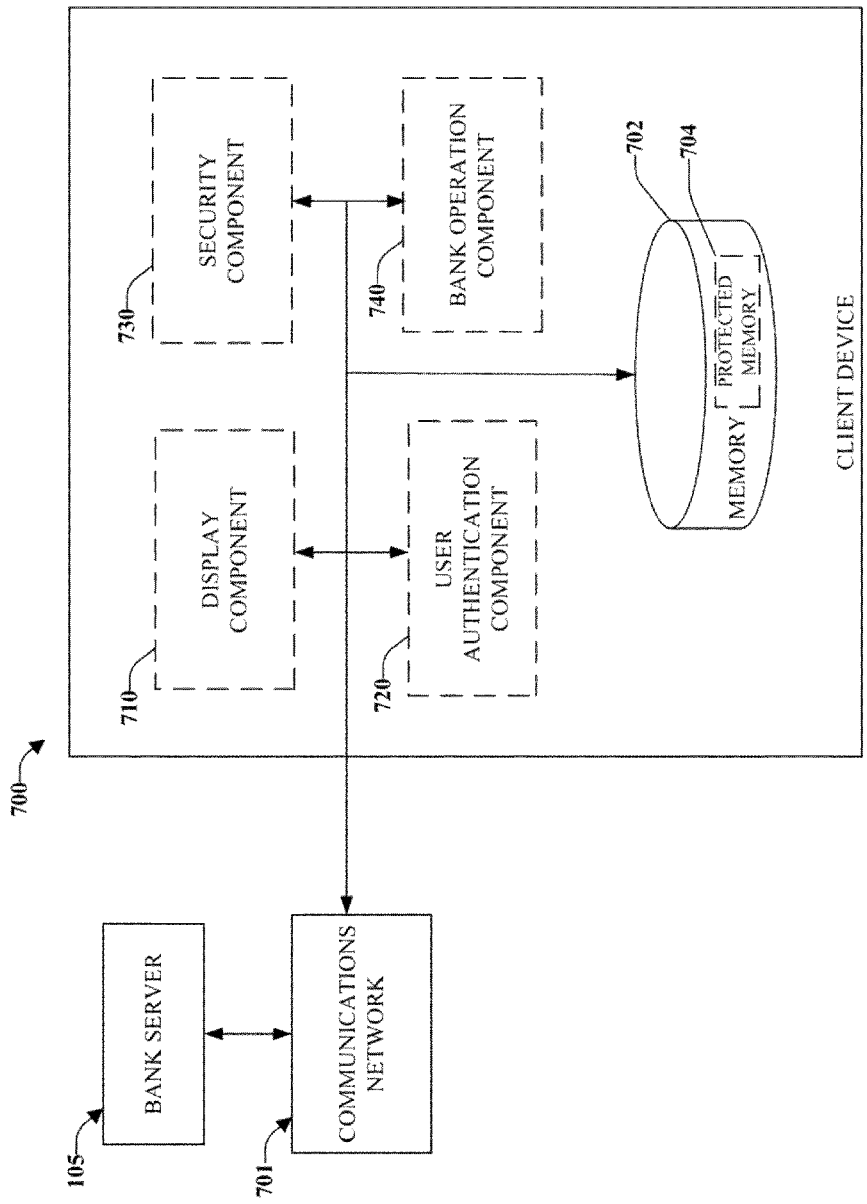
FIG. 7 illustrates an example client device in accordance with the subject disclosure

FIG. 7 illustrates an example client device 201 in accordance with the subject disclosure. A display component 710 can be configured to display a user request wherein the display component further receives a login information and a banking request from a user based on the user request. A user authentication component 720 can be configured to authenticate the user based upon sending the login information to a bank server using a communications network.

A security component 730 can be configured to store in protected memory 1104 a security key associated with the client device wherein the security component is further configured to generate an encrypted banking request based on the security key and the banking request. A bank operation component 740 can be configured to send the encrypted banking request to the bank server using the communications network. In one embodiment the bank operation component is further configured to receive an encrypted banking operation result. The security component 730 can be further configured to generate a decrypted banking operation result based on encrypted banking operation result and the security key. Display component 710 can be further configured to display the decrypted banking operation result.

Figure 8:
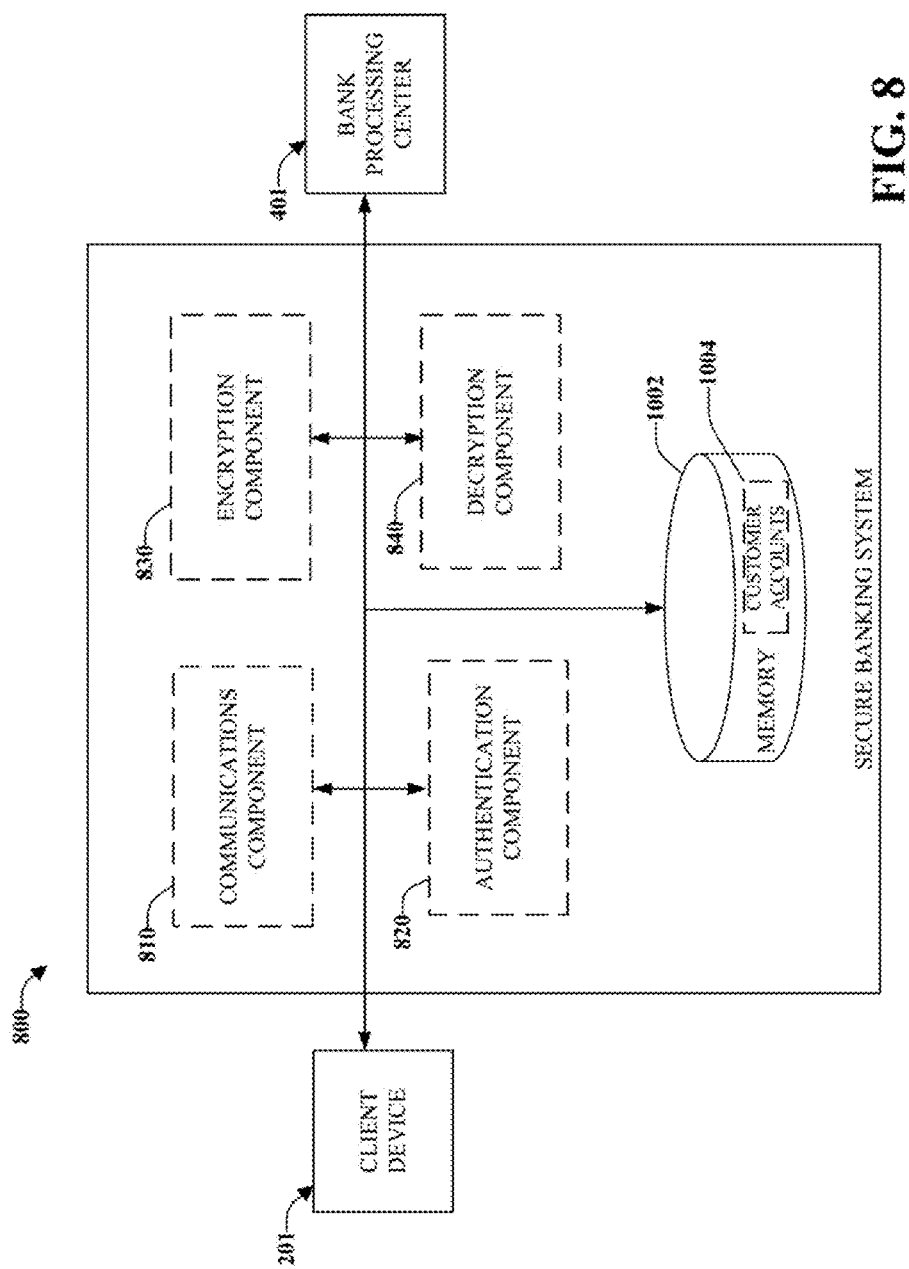
FIG. 8 illustrates an example secure banking system in accordance with the subject disclosure.

FIG. 8 illustrates an example secure banking system 800 in accordance with the subject disclosure. A communications component 810 can be configured to at least one of send or receive data packets with a client device and a bank processing center, wherein data packets received from the client device include a bank operation request, a login information, and device authentication information. In one embodiment the login information can contain a personal identification number. In one embodiment the device authentication information can include a security key or SUID associated with the device.

An encryption component 830 can be configured to encrypt the bank operation request. A decryption component 840 can be configured to decrypt the login information. An authentication component 820 can be configured to authenticate the bank operation request and the client device. It can be appreciated that the authentication component 820 can utilize customer accounts 804 stored in memory 802 in authenticating.

In one embodiment, if the bank operation request, the login information and the client device are all authenticated by the authentication component 820, the bank operation request can be sent to the bank processing center by communications component 810.

In one embodiment the communications component 810 can be further configured to receive a banking operation result from the bank processing center. The decryption component 840 can be further configured to decrypt the banking operation result. The encryption component 830 can be further configured to generate an encrypted banking operation result based upon the banking operation result. The communications component 810 can be further configured to send the encrypted banking operation result to the client device.

In one embodiment, in response to the bank operation request, the login information, and the client device being authenticated by the authentication component 820, the bank operation request can be sent to the bank processing center by the communications component 810.

Figure 9:
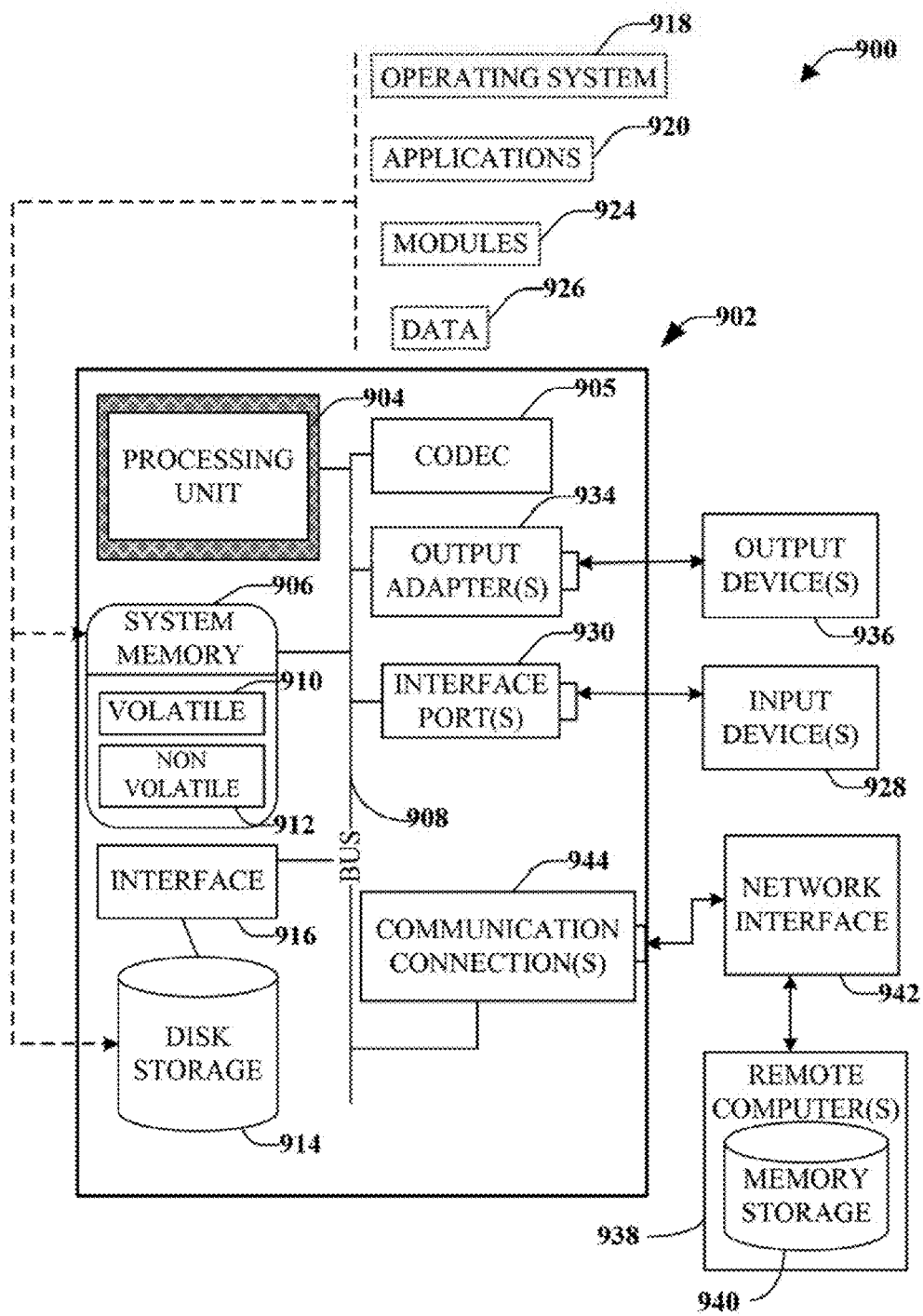
FIG. 9 illustrates an example schematic block diagram for a computing environment in accordance with the subject specification.

With reference to FIG. 9, a suitable environment 900 for implementing various aspects of the claimed subject matter includes a computer 902. The computer 902 includes a processing unit 904, a system memory 906, a codec 905, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 902 may also include removable/non-removable, volatile/non-volatile computer storage media. FIG. 9 illustrates, for example, a disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a bank server, a bank client, a bank processing center, a certificate authority, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
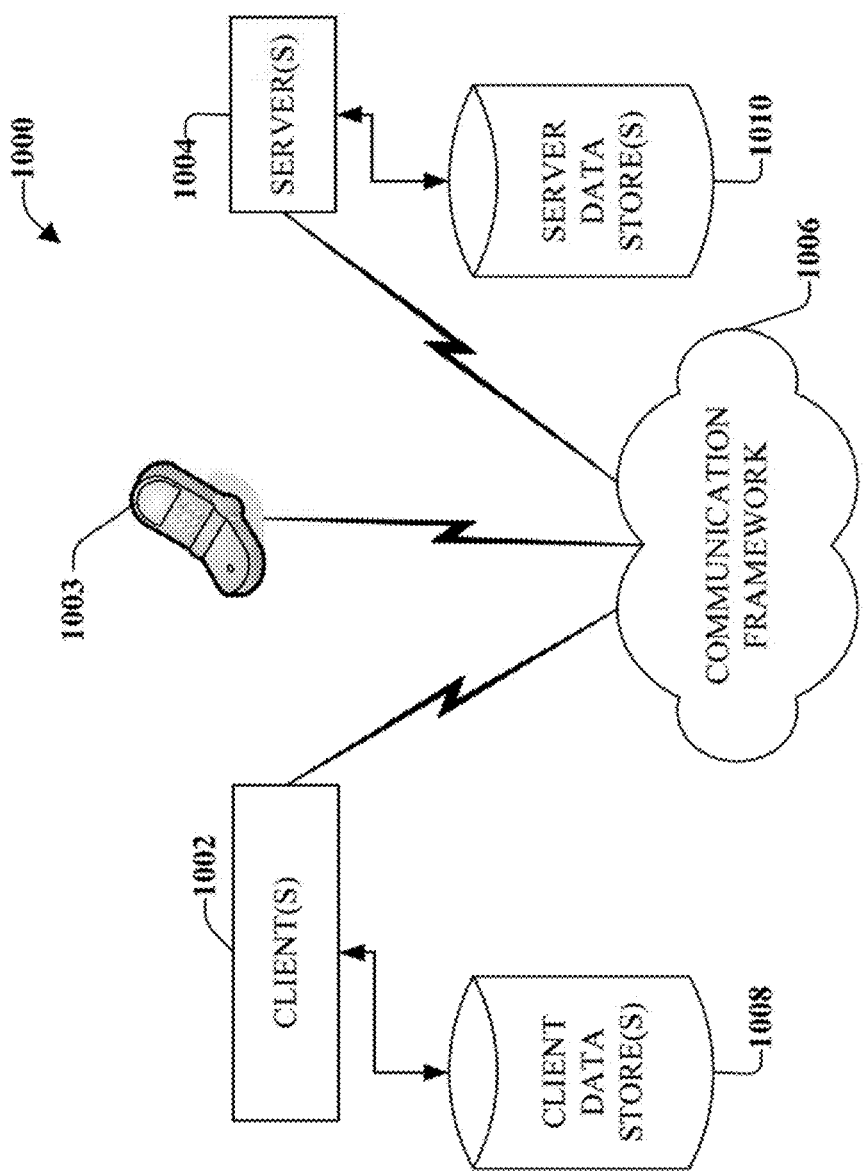
FIG. 10 illustrates an example block diagram of a computer operable to execute the disclosed architecture.

Referring now to FIG. 10, there is illustrated a schematic block diagram of a computing environment 1000 in accordance with the subject specification. The system 1000 includes one or more client(s) 1002, which can include an application or a system that accesses a service on the server 1004. The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform, for example, encryption, decryption, calculations, etc. One possible communication between a client 1002 and a server 1004 can be in the form of a data packet adapted to be transmitted between two or more computer processes where the data packet contains, for example, a certificate. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

The illustrated aspects of the disclosure may also be practiced in distributed computing environments where certain tasks are performed by remote processing devices that are linked through a communications network. In a distributed computing environment, program modules can be located in both local and remote memory storage devices.

The processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject embodiments are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the various embodiments includes a system as well as a computer-readable storage medium having computer-executable instructions for performing the acts and/or events of the various methods of the claimed subject matter.

What is claimed is:
1. A method, comprising:
receiving, by a device comprising a processor, a phone number from a bank client device associated with a user identity;
confirming, by the device, the phone number is associated with a client account;

verifying, by the device, the client account contains no linked devices;
generating, by the device, a first one time password and a second one time password;
sending, by the device, the first one time password to the phone number;
sending, by the device, the second one time password to the bank client device;
receiving, by the device, a password and the second one time password from the bank client device;
verifying, by the device, the second one time password and the password; and
in response to the verifying, creating, by the device, a new client account in association with the user identity.

2. The method of claim 1, further comprising:
establishing, by the device, a secure session with the bank client device.

3. The method of claim 2, wherein the establishing the secure session is based upon a random generated number.

4. The method of claim 1, wherein the verifying the submitted password is based upon comparing the password to the first one time password.

5. The method of claim 1, further comprising:
generating, by the device, a subscriber identification number and a security key pair;
registering, by the device, the subscriber identification number with the client account;
sending, by the device, the subscriber identification number and the security key pair to the bank client device; and
sending, by the device, a confirmation to the phone number.

6. The method of claim 1, further comprising:
sending, by the device, information for display on the bank client device for entry of the password.

7. A non-transitory computer readable storage device comprising executable instructions that, in response to execution, cause a device comprising a processor to perform operations, comprising:
receiving a phone number from a bank client device associated with a user identity;
confirming whether the phone number is associated with a client account;
verifying the client account contains no linked devices;
generating a first one time password and a second one time password;
sending the first one time password to the phone number;
sending the second one time password to the bank client device;
receiving a password and the second one time password from the bank client device;
verifying the second one time password and the password; and
in response to the verifying, creating a new client account in association with the user identity.

8. The non-transitory computer readable storage device of claim 7, wherein the operations further comprise establishing a secure session with the bank client device.

9. The non-transitory computer readable storage device of claim 8, wherein the establishing the secure session is based upon a random generated number.

10. The non-transitory computer readable storage device of claim 7, wherein the verifying the password is based upon comparing the password to the first one time password.

11. The non-transitory computer readable storage device of claim 7, wherein the operations further comprise:
generating a subscriber identification number and a security key pair;
registering the subscriber identification number with the first client account;
sending the subscriber identification number and the security key pair to the bank client device; and
sending a confirmation to the phone number.

12. The non-transitory computer readable storage device of claim 7, wherein the operations further comprise sending information for display on the bank client device for entry of the password.

13. A system, comprising
a processor; and
a memory coupled to the processor and storing executable instructions that, in response to execution by the processor, perform operations, comprising:
receiving a phone number associated with a user identity from a bank client device;
determining whether the phone number is associated with a client account;
verifying the client account contains no linked devices;
generating a first one time password and a second one time password;
sending the first one time password to the phone number;
sending the second one time password to the bank client device;
receiving a password and the second one time password from the bank client device;
verifying the second one time password and the password; and
in response to the verifying, creating a new client account associated with the user identity.

14. The system of claim 13, wherein the operations further comprise:
establishing a secure session with the bank client device.

15. The system of claim 14, wherein the establishing the secure session is based upon a random generated number.

16. The system of claim 13, wherein the verifying the password is based upon comparing the password to the first one time password.

17. The system of claim 13, wherein the operations further comprise:
generating a subscriber identification number and a security key pair;
registering the subscriber identification number with the other client account;
sending the subscriber identification number and the security key pair to the bank client device; and
sending a confirmation to the phone number.

18. The system of claim 13, wherein the operations further comprise:
sending information for display on the bank client device for entry of the password.

* * * * *